United States Patent
Badrinarayanan et al.

(10) Patent No.: US 10,511,032 B2
(45) Date of Patent: Dec. 17, 2019

(54) FUEL CELL WITH PURGE MANIFOLD

(71) Applicant: Audi AG, Ingolstadt (DE)

(72) Inventors: Paravastu Badrinarayanan, Manchester, CT (US); Kazuki Amemiya, Somers, CT (US)

(73) Assignee: AUDI AG, Ingolstadt (DE)

( * ) Notice: Subject to any disclaimer, the term of this patent is extended or adjusted under 35 U.S.C. 154(b) by 136 days.

(21) Appl. No.: 15/679,041

(22) Filed: Aug. 16, 2017

(65) Prior Publication Data

US 2017/0346103 A1 Nov. 30, 2017

Related U.S. Application Data

(62) Division of application No. 13/256,326, filed as application No. PCT/US2009/037483 on Mar. 18, 2009, now Pat. No. 9,780,388.

(51) Int. Cl.
*H01M 8/0232* (2016.01)
*H01M 8/04223* (2016.01)
(Continued)

(52) U.S. Cl.
CPC ....... *H01M 8/0232* (2013.01); *H01M 8/0267* (2013.01); *H01M 8/04179* (2013.01);
(Continued)

(58) Field of Classification Search
CPC .......... H01M 8/0232; H01M 8/04179; H01M 8/04223; H01M 8/04119
See application file for complete search history.

(56) References Cited

U.S. PATENT DOCUMENTS

| | | | |
|---|---|---|---|
| 4,769,297 A | 9/1988 | Reiser et al. | |
| 4,824,741 A | 4/1989 | Kunz | |

(Continued)

FOREIGN PATENT DOCUMENTS

| | | |
|---|---|---|
| JP | 2002-539583 A | 11/2002 |
| JP | 2004-111196 A | 4/2004 |

(Continued)

OTHER PUBLICATIONS

International Preliminary Report on Patentability, dated Sep. 20, 2011, form International Application No. PCT/US2009/037483, 5 pages.

(Continued)

*Primary Examiner* — Osei K Amponsah
(74) *Attorney, Agent, or Firm* — Seed Intellectual Property Law Group LLP

(57) ABSTRACT

A fuel cell includes an electrode assembly having an electrolyte between an anode and a cathode for generating an electric current and byproduct water. A porous plate is located adjacent to the electrode and includes reactant gas channels for delivering a reactant gas to the electrode assembly. A separator plate is located adjacent the porous plate such that the porous plate is between the electrode assembly and the separator plate. The separator plate includes a reactant gas inlet manifold and a reactant gas outlet manifold in fluid connection with the reactant gas channels, and a purge manifold in fluid connection with the porous plate such that limiting flow of the reactant gas from the reactant gas outlet manifold and opening the purge manifold under a pressure of the reactant gas in the reactant gas channels drives the byproduct water toward the purge manifold for removal from the fuel cell.

9 Claims, 1 Drawing Sheet

(51) Int. Cl.
  *H01M 8/04119* (2016.01)
  *H01M 8/04225* (2016.01)
  *H01M 8/04228* (2016.01)
  *H01M 8/2483* (2016.01)
  *H01M 8/0267* (2016.01)

(52) U.S. Cl.
  CPC ... *H01M 8/04223* (2013.01); *H01M 8/04225* (2016.02); *H01M 8/04228* (2016.02); *H01M 8/2483* (2016.02)

(56) References Cited

U.S. PATENT DOCUMENTS

| | | |
|---|---|---|
| 6,617,068 B2 | 9/2003 | Dufner et al. |
| 6,723,461 B2 | 4/2004 | Gorman et al. |
| 6,908,711 B2 | 6/2005 | Fauteux et al. |
| 7,081,316 B2 | 7/2006 | Rock et al. |
| 7,354,669 B2 | 4/2008 | Hobmeyr et al. |
| 7,435,502 B2 | 10/2008 | Breault et al. |
| 8,101,319 B2 | 1/2012 | Mikhail et al. |
| 2003/0087145 A1 | 5/2003 | Yasumoto et al. |
| 2004/0142217 A1 | 7/2004 | Couch et al. |
| 2005/0175873 A1 | 8/2005 | Edwards et al. |
| 2005/0191541 A1* | 9/2005 | Gurau .................. H01M 8/0258 429/414 |
| 2006/0240292 A1 | 10/2006 | Guo et al. |
| 2008/0118809 A1 | 5/2008 | Tighe et al. |
| 2008/0220325 A1 | 9/2008 | Khan et al. |
| 2010/0068570 A1 | 3/2010 | Otake |

FOREIGN PATENT DOCUMENTS

| | | |
|---|---|---|
| JP | 2004-193105 A | 7/2004 |
| JP | 2007-165173 A | 6/2007 |
| JP | 2007-213928 A | 8/2007 |
| JP | 2008-19252 A | 1/2008 |
| JP | 2008-269800 A | 11/2008 |
| JP | 2008-311160 A | 12/2008 |
| JP | 2009-48790 A | 3/2009 |
| WO | 2008/090430 A1 | 7/2008 |

OTHER PUBLICATIONS

International Search Report and Written Opinion of the International Searching Authority, dated Dec. 28, 2009, for International Application No. PCT/US2009/037483, 7 pages.

* cited by examiner

FUEL CELL WITH PURGE MANIFOLD

BACKGROUND OF THE DISCLOSURE

This disclosure relates to fuel cells for generating electricity. Conventional fuel cells typically include an anode, a cathode, and an electrolyte between the anode and the cathode for generating an electric current in a known electrochemical reaction between reactant gases, such as hydrogen and air. The electrochemical reaction produces water as a byproduct. Typically, the water is removed from the cell using an adjacent structure, such as a plate.

One problem associated with such fuel cells is that upon shutdown of the fuel cell, water can remain in the fuel cell. Under cold conditions, the water may freeze and subsequently inhibit movement of the reactant gases to the anode and cathode when the fuel cell is restarted. One possible solution is to allow the water to drain out of the fuel cell after shutdown. However, draining the water may take a considerable amount of time and may require auxiliary pumps or other parasitic power devices.

SUMMARY OF THE DISCLOSURE

An exemplary fuel cell includes an electrode assembly having an electrolyte between an anode and a cathode for generating an electric current and byproduct water. A porous plate is located adjacent to the electrode and includes reactant gas channels for delivering a reactant gas to the electrode assembly. A separator plate is located adjacent the porous plate such that the porous plate is between the electrode assembly and the separator plate. The separator plate includes a reactant gas inlet manifold and a reactant gas outlet manifold in fluid connection with the reactant gas channels, and a purge manifold in fluid connection with the porous plate such that limiting flow of the reactant gas from the reactant gas outlet manifold and opening the purge manifold under a pressure of the reactant gas in the reactant gas channels drives the byproduct water toward the purge manifold for removal from the fuel cell.

An exemplary method of managing water removal in the fuel cell includes limiting flow of the reactant gas from the reactant gas manifold, allowing a flow of the byproduct water through the purge manifold, and establishing a pressure of the reactant gas in the reactant gas channels such that the reactant gas drives the byproduct water toward the purge manifold for removal from the fuel cell.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
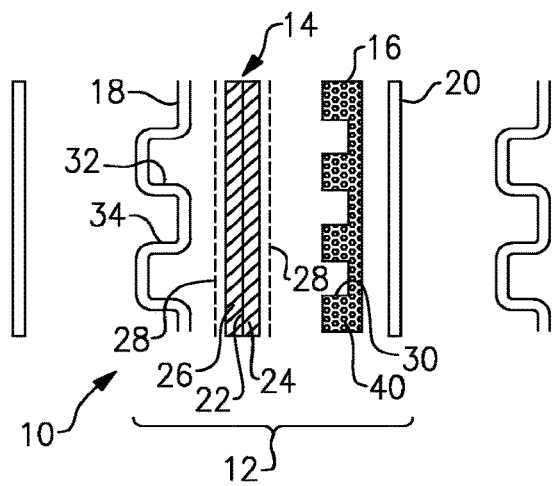
FIG. 1 illustrates an example fuel cell.

FIG. 1 illustrates schematic, exploded view of selected portions of an example fuel cell 10. In this example, the fuel cell 10 includes a fuel cell unit 12 that operates in a known manner to generate electricity. For instance, multiple fuel cell units 12 may be stacked in a known manner to provide a desired amount of electrical output. However, it is to be understood that this disclosure is not limited to the arrangement of the example fuel cell 10, and the concepts disclosed herein may be applied to other fuel cell arrangements.

The fuel cell unit 12 includes an electrode assembly 14 located between a porous plate 16 and an anode separator plate 18. The porous plate 16 is located between the electrode assembly 14 and a cathode separator plate 20.

The electrode assembly 14 may include an electrolyte 22 located between a cathode 24 and an anode 26. Optionally, a gas diffusion layer 28, such as a porous or fibrous layer, may be located between the electrode assembly 14 and each of the anode separator plate 18 and the porous plate 16.

In this example, the porous plate 16 includes reactant gas channels 30 for delivering a reactant gas, such as an oxidant (e.g., air), to the cathode 24 of the electrode assembly 14. Likewise, the anode separator plate 18 may include channels 32 for delivering another reactant gas, such as hydrogen, to the anode 26 of the electrode assembly 14. In this case, the anode separator plate 18 also includes coolant channels 34 on the opposite side of the anode separator plate 18 from the reactant gas channels 32 for cooling the fuel cell 10.

The porous plate 16 includes pores 40 for facilitating water redistribution through the fuel cell 10, such as liquid byproduct water from the electrochemical reaction at the electrode assembly 14. For instance, the pores 40 may have an average pore radius of 0.1-10 micrometers (3.9-394 microinches). Additionally, the porous plate 16 may have a porosity that is about 5-50%. The example average pore size and porosity provide the benefit of wicking water away from the electrode assembly 14 by using capillary forces, for example.

The porous plate 16, the anode separator plate 18, and the cathode separator plate 20 may be made of any suitable material for achieving the given functions. In a few non-limiting examples, the porous plate 16, the anode separator plate 18, the cathode separator plate 20, or each are made from a material including carbon, iron, nickel, chromium, aluminum, titanium, gold, platinum, or combinations thereof.

Figure 2:
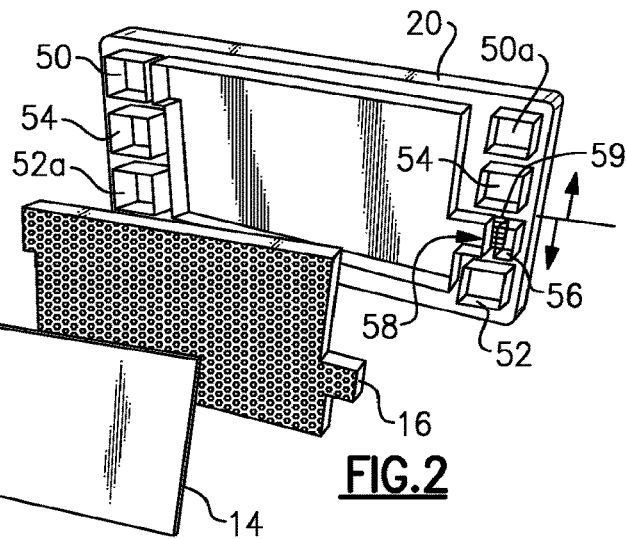
FIG. 2 illustrates a perspective view of a cathode separator plate, porous plate, and an electrode assembly of the fuel cell.

FIG. 2 illustrates a perspective view of the electrode assembly 14, the porous plate 16, and the cathode separator plate 20. The cathode separator plate 20 includes a reactant gas inlet manifold 50 and a reactant gas outlet manifold 52 that are fluidly connected with the reactant gas channels 30 of the porous plate 16 such that a reactant gas delivered through the reactant gas inlet manifold 50 is allowed to flow through the reactant gas channel 30 and exit through the reactant gas outlet manifold 52. A second reactant gas inlet manifold 50a and a second reactant gas outlet manifold 52a may likewise be used to deliver fuel to the reactant gas channels 32 of the anode separator plate 18. The cathode separator plate 20 may also include coolant manifolds 54 for circulating coolant through the coolant channels 34 of the anode separator plate 18.

The cathode separator plate 20 also includes a purge manifold 56 that is in fluid connection with the porous plate 16. For instance, the purge manifold 56 is adjacent to the porous plate 16 to collect water therefrom, as will be described below. Optionally, the cathode separator plate 20 may include a divider 58 that separates the purge manifold 56 from porous plate 16. The divider 58 may include channels 59 adjacent one side of the cathode separator plate 20 (i.e., the back side in FIG. 2) that extend through the divider between the porous plate 16 and the purge manifold 56 to facilitate water transport. For instance, water movement in the plane of the porous plate 16 may be limited because of pore size. By locating the channels at one side of the cathode separator plate 20, the channels promote water movement through the thickness of the cathode separator plate 20 (i.e., out-of-plane water movement), which is not so limited.

Figure 3:
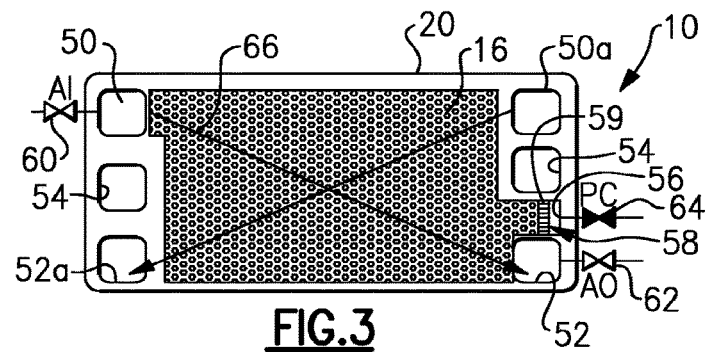
FIG. 3 illustrates a view of the cathode separator plate and the porous plate showing the flow of reactant gases during normal operation.

Referring to FIG. 3, the fuel cell 10 may also include an inlet valve 60 associated with the inlet manifold 50, and an outlet valve 62 associated with the reactant gas outlet manifold 52. For instance, the inlet valve 60 may be used in a known manner to control flow of the reactant gas into the reactant gas inlet manifold 50, and the outlet valve 62 may be used to limit flow of the reactant gas from the reactant gas outlet manifold 52. The flow arrow 66 generally indicate the direction of flow of the reactant gas between the reactant gas inlet manifold 50 and the reactant gas outlet manifold 52 when the inlet valve 60 and the outlet valve 62 are open. Likewise, the reactant gas inlet manifold 50a and the reactant gas outlet manifold 52a may also include valves for controlling the flow of fuel between the reactant gas channels 32 of the anode separator plate 18.

The fuel cell 10 also includes a purge valve 64 associated with the purge manifold 56 for controlling flow through the purge manifold 56 to the surrounding environment. As illustrated in FIG. 3, the reactant gas flows from the reactant gas inlet manifold 50 toward the reactant gas outlet manifold 52 when the inlet valve 60 is in an open state, the outlet valve 62 is in an open state, and the purge valve 64 is in a closed state.

Figure 4:
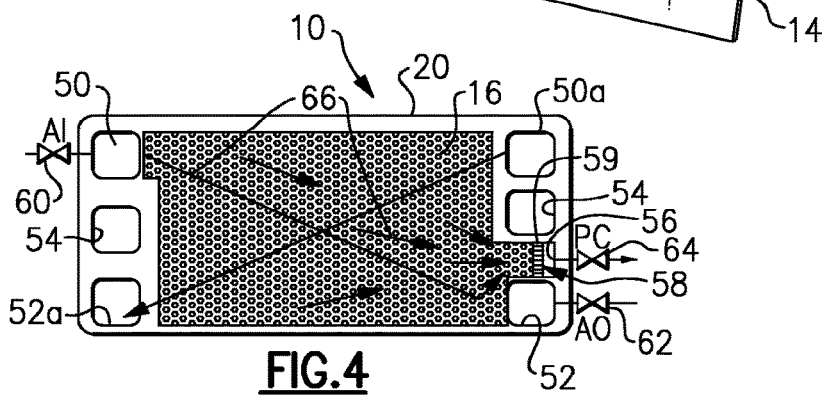
FIG. 4 illustrates a view of the cathode separator plate and the porous plate showing purging of water in the fuel cell.

However, as illustrated in FIG. 4, the outlet valve 62 may be closed and the purge valve 64 may be opened to purge water from the fuel cell 10 upon shutdown, for example. For instance, the outlet valve 62 may be at least partially closed or completely closed to limit the flow of the reactant gas through the reactant gas outlet manifold 52. The purge valve 64 may be opened in conjunction with closing of the outlet valve 62 such that the reactant gas within the reactant gas channels 30 of the porous plate 16 flows toward the purge manifold 56, as indicated by flow arrows 66, rather than the reactant gas outlet manifold 52. The pressure of the reactant gas in the reactant gas channels 30 drives out water in the fuel cell 10, such as water within the pores 40 of the porous plate 16, water in the gas diffusion layer 28, or water in other locations, to facilitate avoidance of freezing after shutdown.

In one example, the flow of the reactant gas into the fuel cell 10 through the reactant gas inlet manifold 50 may be controlled to purge any remaining water. For example, the flow may be controlled to establish an elevated pressure (relative to the surrounding environment) to drive out the water. The pressure may be about 10-200 kPag (1.45-29 psi). In another example, the pressure may be about 100-200 kPag (14.5-29 psi) to overcome capillary pressures within the pores 40 of the porous plate 16 and thereby drive the water out from the pores 40. In this regard, the fuel cell 10 can be rapidly flushed of the water by pressurizing the fuel cell 10 with the reactant gas. Using the pressure of the reactant gas eliminates waiting for gravitational forces alone to remove the water, and also eliminates the need for using parasitic auxiliary equipment to pump the water out. For instance, the fuel cell 10 may be rapidly flushed of the water during, just before, or just after shutdown.

The purge manifold 56 may be located anywhere on the cathode separator plate 20. In the illustrated example, the purge manifold 56 is located toward the bottom of the cathode separator plate 20 and below the reactant gas inlet manifold 50 to additionally utilize gravitational forces to remove the water. In a further example, the cathode separator plate 20 includes an upper half and a lower half (as indicated at 59 when oriented vertically), and the purge manifold 56 is located within the lower half to utilize gravitational forces to facilitate removal of the water. In other examples, the purge manifold 56 may be at the bottom of the cathode separator plate 20.

U.S. patent application Ser. No. 13/256,326 is hereby incorporated herein by reference in its entirety.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel cell comprising:
an electrode assembly including an electrolyte between an anode and a cathode for generating an electric current and byproduct water;
a porous plate adjacent the electrode assembly, the porous plate including reactant gas channels for delivering a reactant gas to the electrode assembly; and
a separator plate adjacent the porous plate such that the porous plate is between the electrode assembly and the separator plate, the separator plate including a reactant gas inlet manifold and a reactant gas outlet manifold in fluid connection with the reactant gas channels, and a purge manifold in fluid connection with the porous plate such that limiting flow of the reactant gas through the reactant gas outlet manifold and opening the purge manifold under a pressure of the reactant gas in the reactant gas channels drives the byproduct water through pores in the porous plate toward the purge manifold for removal from the fuel cell.

2. The fuel cell as recited in claim 1, wherein the porous plate is directly adjacent the cathode.

3. The fuel cell as recited in claim 1, further comprising an outlet valve associated with the reactant gas outlet manifold for limiting flow of the reactant gas through the reactant gas outlet manifold, and a purge valve associated with the purge manifold for selectively limiting flow of the reactant gas through the purge manifold.

4. The fuel cell as recited in claim 1, wherein the porous plate includes an average pore size of about 0.1-10 micrometers.

5. The fuel cell as recited in claim 1, wherein the porous plate has a porosity of about 5-50%.

6. The fuel cell as recited in claim 1, wherein the porous plate has a water contact angle of about 0-90°.

7. The fuel cell as recited in claim 1, wherein at least one of the porous plate or the separator plate includes a material selected from the group consisting of carbon, iron, nickel, chromium, aluminum, titanium, gold, platinum, and combinations thereof.

8. The fuel cell as recited in claim 1, wherein the purge manifold is below the reactant gas inlet manifold when the separator plate is vertically oriented.

9. The fuel cell as recited in claim 1, wherein the purge manifold is located in a lower half of the separator plate when the separator plate is vertically oriented.

* * * * *